United States Patent [19]

Price

[11] 4,428,696

[45] Jan. 31, 1984

[54] CONDUIT CONNECTORS FOR LIGHTING SYSTEMS

[75] Inventor: Edison A. Price, New York, N.Y.

[73] Assignee: Edison Price, Incorporated, New York, N.Y.

[21] Appl. No.: 345,349

[22] Filed: Feb. 3, 1982

[51] Int. Cl.³ ............................. F16B 7/08; F16B 9/00
[52] U.S. Cl. ................................. 403/168; 362/220; 362/226
[58] Field of Search ............... 362/220, 226, 408, 426; 403/353, 361, 168, 167, 388

[56] References Cited

U.S. PATENT DOCUMENTS

| | | | | |
|---|---|---|---|---|
| 2,016,284 | 10/1935 | Knight | ............................ | 403/168 X |
| 2,656,087 | 10/1953 | Sharrock | ........................ | 403/168 X |
| 2,850,300 | 9/1958 | Jennings | ........................... | 403/168 X |
| 3,615,111 | 10/1971 | Grosseau | ........................ | 403/167 X |
| 4,098,555 | 7/1978 | Vollenweider | ................ | 403/168 X |

Primary Examiner—Wayne L. Shedd
Attorney, Agent, or Firm—McAulay, Fields, Fisher, Goldstein & Nissen

[57] ABSTRACT

In a lighting system having lighting fixtures including end plates and a method of assembling same with rigid conduit connectors therebetween, each end plate is formed with at least one alignable key hole thereon having a substantially circular Archimedean spiral circumference and each conduit connector comprises a tube having a substantially circular Archimedean spiral surface configured to be longitudinally slidably received in each key hole in one given angular orientation and to provide a friction-tight fit in the key hole in response to rotation of the tube around its longitudinal axis is one direction from said one given angular orientation.

12 Claims, 14 Drawing Figures

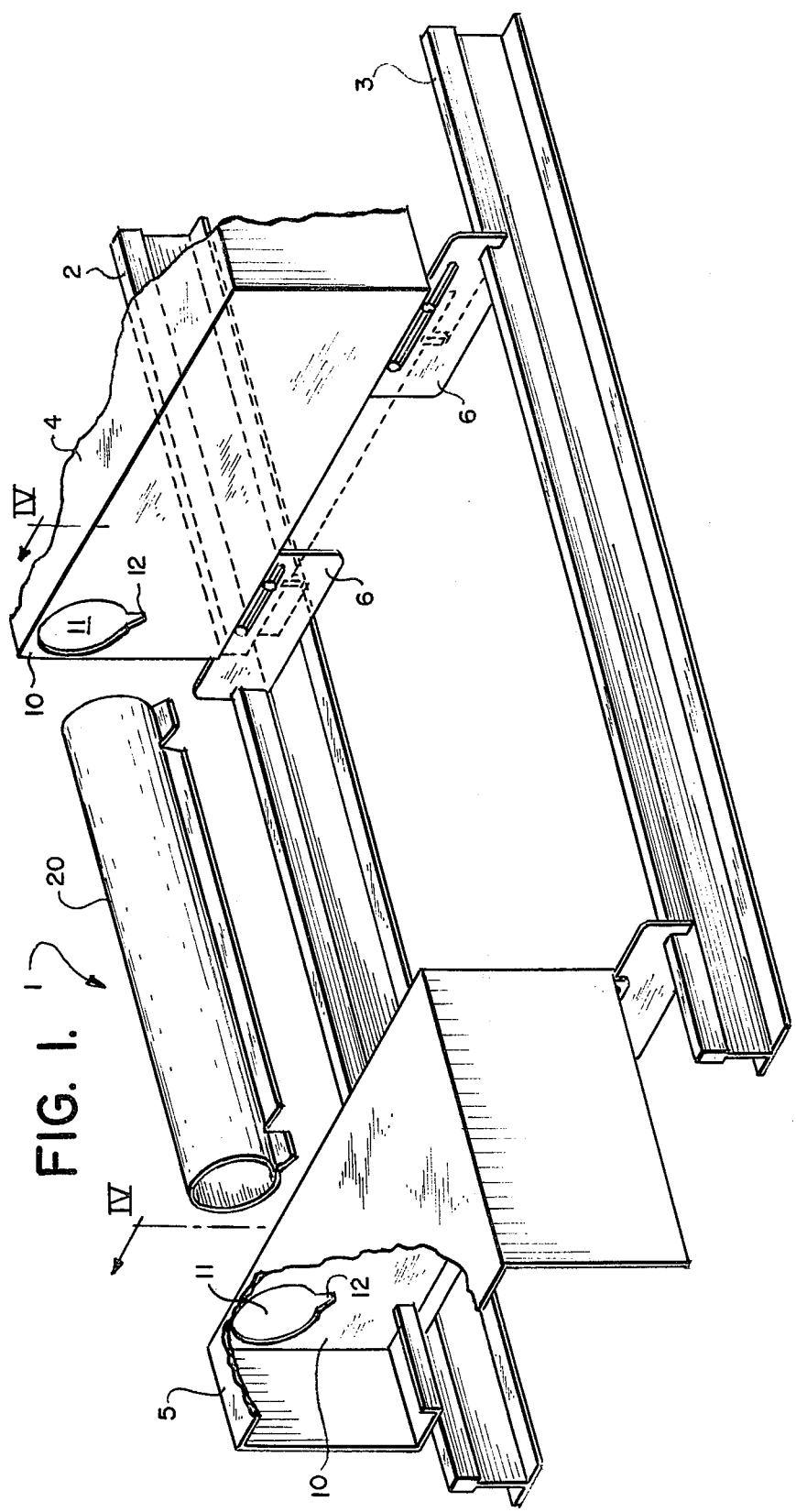
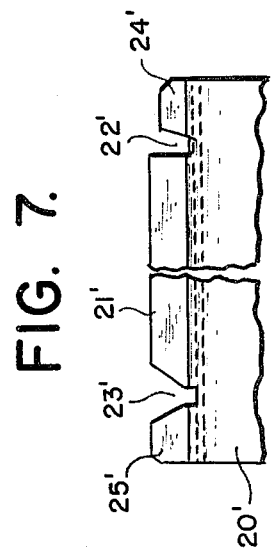
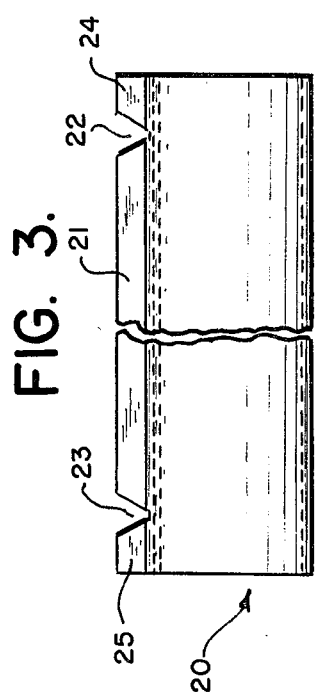
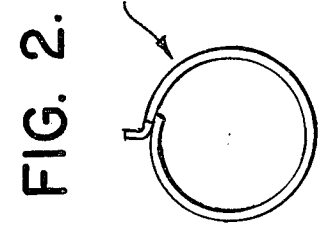

CONDUIT CONNECTORS FOR LIGHTING SYSTEMS

BACKGROUND OF THE INVENTION

The present invention is directed to installations of rows of recessed fluorescent lighting fixtures and to a method of assembling same wherein lighting fixtures are mounted on rails or tracks and interconnected with rigid hollow conduits which carry wires from one light fixture to another.

In conventional recessed lighting systems, the lighting fixtures are mounted along the ceiling supporting rails. In order to assemble such systems, each lighting fixture is mounted on the rails, with one of two adjacent fixtures placed in a predetermined desired position. Thereafter, a rigid conduit having threaded ends is inserted into an end plate of the lighting fixture having a punch-out aperture therein. Two lock nuts are threaded on the threaded ends with the end plate of the lighting fixtures therebetween and tightened. The adjacent lighting fixture is then slid into place with the rigid conduit passing through an aperture in its side plate with the same lock nut mounting. This adjacent lighting fixture is then clamped into its position. This procedure is followed for each lighting fixture along the track until all of the lighting fixtures that are required for the installation are fixed in place. The electrical conductors are then passed from fixture to fixture through the conduit connections.

The disadvantages of the conventional lighting fixture system and method of assembling same is that if it is desired to remove or merely move one of the fixtures in a line, all of the fixtures have to be unclamped to do so. This makes any such readjusting or removal operation a considerable task.

SUMMARY OF THE INVENTION

The main object of the present invention is to eliminate the disadvantages of the conventional recessed ceiling lighting systems and to provide a system which is more economical and simpler to manufacture and which is more convenient and easier to assemble and disassemble.

These and other objects of the present invention are achieved in a lighting system according to the present invention wherein each of the end plates of adjacent lighting fixtures has means forming at least one alignable key hole therein having a substantially circular Archimedean spiral circumference and each rigid conduit connector comprises a tube having a substantially circular Archimedean spiral surface configured to be longitudinally slidably received in each key hole in one given angular orientation and to provide a friction-tight fit in the key hole in response to rotation of the tube around its longitudinal axis in one direction from the one given angular orientation.

In a preferred embodiment of the invention, the tube includes a flange projecting radially outwardly from the surface of the tube at the edge of greatest radius and a notch at each end portion of the flange spaced inwardly from the edge thereof and extending radially to the surface of the tube to divide the flange into three separate tabs. The key hole in each end plate of the lighting fixture includes a slot extending radially outwardly from the circumference thereof and is configured to slidably receive the flange therein when the tube is in the one given angular orientation. In this manner, the lighting fixtures can be spaced apart by a distance defined as the distance between the notches which define the tabs.

In accordance with the method of the present invention, the tube is inserted between the two adjacent lighting fixtures with the notches aligned with the end plates thereof and is merely twisted in the one direction until the friction-tight fit is achieved. The friction-tight fit is achieved since, as the tube is rotated, it contracts and acts as a spiral spring and radial forces are exerted towards the edges of the key hole creating constant metal to metal contact and creating a friction tight metal-ground connection. By configuring the notches with a V-shape, the tube reliably immobilizes itself with respect to the fixtures and the fixtures with respect to each other and may also provide electical grounding continuity.

The tubing then acts as a wireway and a spacer for the lighting fixtures.

In order to achieve this friction-tight fit, the spiral key hole is sized slightly larger than the outer diameter of the tube. However, in a preferred embodiment the tolerances between the key hole and the outer diameter of the tube should be such so as to permit the tube in one fixture hole to be angled down past the adjacent fixture and removed after the fixtures are clamped into place.

The end plates of the light fixtures may also include stops, which may be formed from tabs projecting inwardly of the fixture and cooperative with the flange of the tube to limit the amount of rotation of the tube in the one direction.

Further, in order to aid in the spacing apart of the lighting fixtures, the system includes means for releasably and temporarily retaining one end of the tube in the key hole. This is carried out by configuring the notch at the end of the tube to be releasably retained so that it extends into the surface of the tube and is configured to enable the tube to be rotated in the other direction from the one given angular orientation to engage one side of the wall defining the slot. In this manner the tube can be temporarily held in place. In order to guide the adjacent lighting fixture into place, the key hole slot on the end plate facing the tube has a cutout at the side of the slot disposed in the other rotational direction. The cutout extends radially from the key hole circumference and terminates short of the end of the slot and has a height less than that of the flange. The notch at the end of the tube corresponding to the side with the cutout has the inward edge thereof cut normal to the longitudinal axis of the tube and the one tab adjacent thereto has a reduced radial length which is configured to be slidably received in the cutout. Thus in a preferred embodiment of the method according to the present invention, the adjacent light fixture is merely slid along the track with the reduced height tab of the tube which has been temporarily retained, passing through the cutout in the key hole slot until the flange abuts against the end plate. This now defines the predetermined position of the adjacent lighting fixture and the tube is then rotated in the "normal" or "locking" direction until the friction-tight fit is obtained.

In a particularly commercially advantageous embodiment of the invention, the tube including the flange and end tabs are formed from a single integral metal member.

The system according to the present invention has the advantage, with respect to the releasable retaining means, of enabling the lighting fixtures to be shipped with the tube mounted within one fixture and with the electrical conductors or wires already disposed therethrough. The tube is merely retained in the temporary locked position with the main body of the tube within the fixture and is simply released, slid through the key hole and attached to the adjacent fixture in the normal manner according to the present invention. The wires which are already placed within the tube may be provided with terminating plugs. The plugs may extend beyond the tube, thus making it a simple matter to connect it to the adjacent fixture.

The above and other objects, features and advantages of the present invention will become apparent in the following detailed description of illustrative embodiments thereof which is to be read in connection with the accompanying drawings, wherein:

BRIEF DESCRIPTION OF THE DRAWINGS

FIG. 1 is a partial exploded view of the recessed ceiling lighting system according to the present invention;

FIG. 2 is an end view of the connector tube according to the present invention;

FIG. 3 is a side view of the connector tube according to the present invention;

FIG. 7 is a partial side view of another embodiment of the tube according to the present invention.

DETAILED DESCRIPTION OF THE PREFERRED EMBODIMENTS

Figure 4:
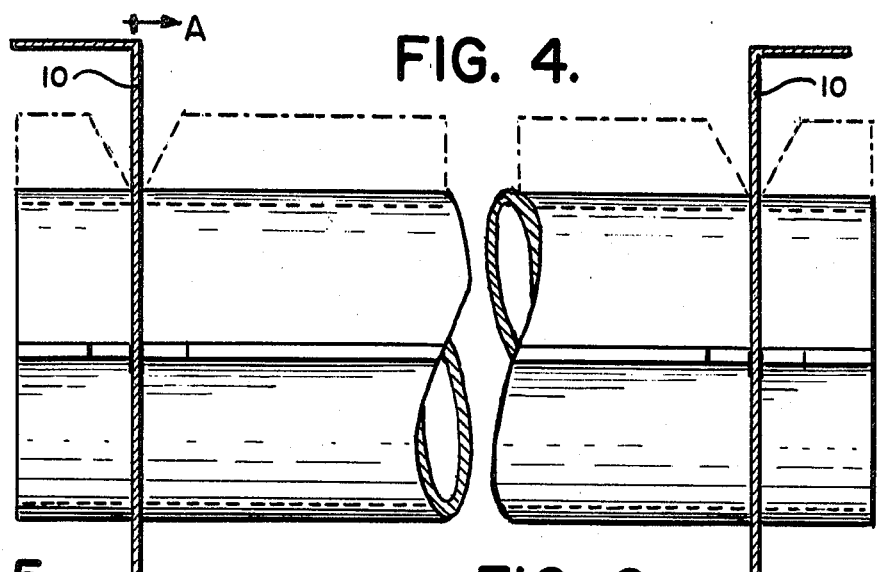
FIG. 4 is a sectional view along line IV—IV of FIG. 1, of the connector tube in the initial or primary angular orientation, shown in solid line, and in the position after rotation in the locking direction, shown in dotted line.

Referring now to FIG. 1, the lighting system according to the present invention has tracks or rails 2, 3 mounted so as to support a ceiling and on which two or more lighting fixtures 4, 5 are slidably mounted on fixture mounts 6. The lighting fixtures 4, 5 include clamps or collars (not shown) for fixing same in place along the track in the desired position.

The lighting fixtures 4, 5 house lamps and the circuitry therefor and also include end plates 10, on both ends thereof. In conventional lighting fixtures, the end plates are made from a thin guage metal and include prestamped portions which can be punched out by a screwdriver or other tool to form a round hole receptive of the conduit connector. In the present invention, the key hole apertures 11 have a substantially circular Archimedean spiral circumference and preferably include a key hole slot 12 which extends radially outwardly from the circumference. The key holes 11 as well as the slots 12 on the end plates of the fixtures are aligned thus enabling the tubing to extend therebetween parallel to the tracks 2, 3. The key hole 11 and slot 12 can be precut in the side plate or can be formed with a punch-out member as in conventional fixtures, with the exception of the different shape. The pitch of the Archimedean spiral is approximately equal to the thickness of the wall of tube.

Disposed between adjacent fixtures 4, 5 is the conduit connector 20 comprising a tube shown in more detail in FIGS. 2 and 3.

The tube has a substantially circular Archimedean open spiral surface and a flange 21 extending radially outwardly from the surface of the tube 20 at the edge of greatest radius. The flange 21 has notches 22, 23 at each end portion thereof spaced inwardly from the edge of the tube and extending radially to the surface of the tube to form end tabs 24, 25 outwardly of the notches.

Figure 5:
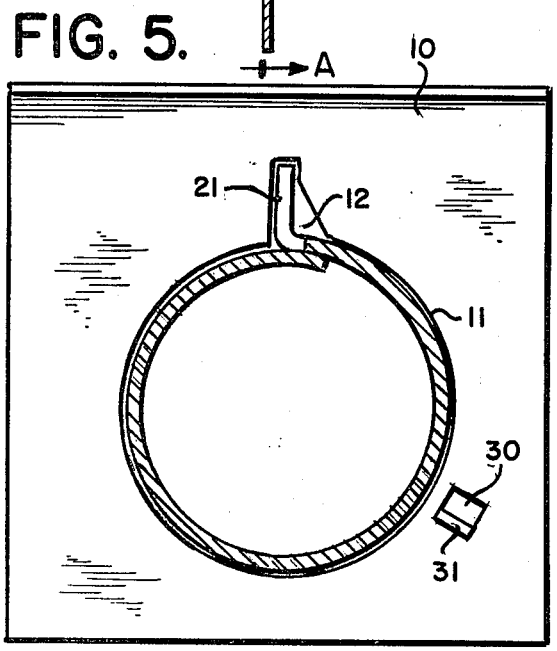
FIGS. 5 and 6 show sectional views along line A—A of FIG. 4 of the tube in the key hole in the two positions illustrated in FIG. 4.
Figure 6:
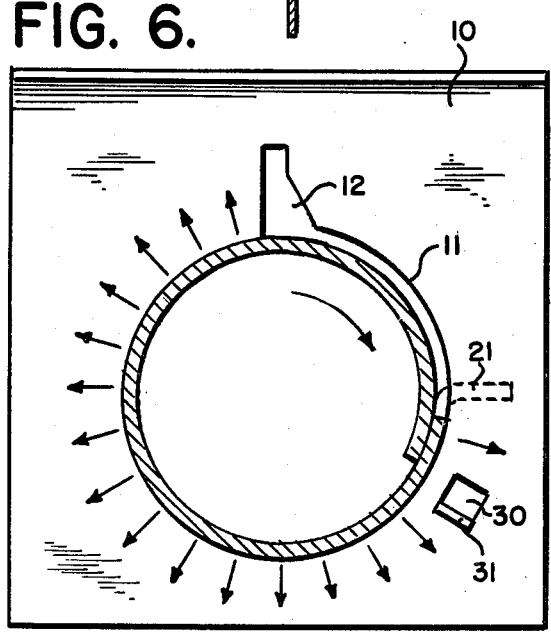

FIGS. 4-6 illustrate the action of the tube 20 with respect to the mounting thereof in the key holes 11 of adjacent fixtures 4, 5.

According to the method of the present invention, the fixture 5 is positioned in a desired location and clamped in place. Thereafter, the tube 20 has one end thereof with tab 24 slidably inserted into the key hole of fixture 4 with the flange aligned with the slot 12. This assures the initial orientation of the tube 20. The tube 20 is inserted until notch 22 is aligned with the wall of the end plate 10 of fixture 4 and thereafter the fixture is slid along the track until the end of tube 20 is inserted into the key hole slot of fixture 5 with the notch 23 aligned with the end plate 10.

This position which has been reached is the position shown by the dotted lines in FIG. 4 and by the side view of the tube in FIG. 5.

Because the spiral key hole is shaped to be similar to the spiral surface of the tube 20 but with a slightly larger diameter than the outer diameter of the tube, as the tube is rotated in the clockwise direction, the shape of the holes forces the tube to contract so that it acts as a spiral spring exerting radial forces (see arrows) towards the edges of the key hole 11 and creating a constant metal to metal contact and strong friction fit. This metal to metal contact creates a continuous ground from fixture to fixture. The pressure urging this metal-to-metal contact between the tube and the end plate provides a reliable grounding continuity with less than a 15 millivolt drop across the junction using a 30 ampere test current. The tight friction fit between the tube and the end plates also prevents the tube from loosening by rotating in a counter-clockwise direction as a result of vibration. After 24 hours of vibration testing in a longitudinal direction and 24 hours of vibration testing in a transverse direction there is no change in the millivolt drop measured across the junction of the tube and plate.

In practice the tube is rotated by grasping it with one hand and then turning it in the desired direction, and the flange prevents the tube from slipping while this is being done and permits a substantial rotational force to be imparted to the tube by the hand.

The solid lines in FIG. 4 and the representation of the tube in FIG. 6 show the action thereof with respect to the key hole 11 when the tube is rotated clockwise.

After the tube is rotated in the clockwise direction as shown in FIG. 6, the fixture 4 can be clamped in place and the interconnection between fixture 4 and the next adjacent fixture can be carried out in a similar manner.

FIGS. 5 and 6 also show another feature of the invention which includes the stop means 30 for limiting the rotation of the tube in the clockwise direction in the embodiment shown. The stop means 30 comprises a tab in the end plate 10 extending inwardly of the fixture and which coacts with the tabs 24, 25 to prevent rotation by more than a particular angle. In a preferred embodiment of the invention the maximum angle of rotation is about 160°. Any greater rotation would result in an abrupt loosening of the tube and defeat the purpose of the invention.

In a particularly commercially advantageous embodiment of the present invention, the tube 20 is formed from a single piece of 18 guage zinc coated steel roll formed and has an Archimedean spiral pitch of 0.050 inches in a 360° revolution. The radius of the tube at the outer surface thereof preferably ranges from a minimum of 0.512 inches to a maximum of 0.562 inches. The flange preferably extends 0.200 inches from the point of greatest radius and the overlap of the spiral shown in FIG. 2 is approximately 15°. The notches 22, 23 are preferably spaced approximately ⅜ths inches from the ends of the tube and have a 60° substantially V-shaped configuration. At the base of the notches, the width thereof is approximately 0.045 inches for an end plate thickness of approximately 0.036 inches.

The tube according to the present invention can be cut to standard lengths in the final stage of the roll forming operation or can be produced in long lengths and cut to desired lengths with the notches added thereafter.

The tube according to the present invention is also useful for connecting other types of electrical fixtures such as electrical equipment boxes and may act as a spacer, a conduit wire way or a holder of other wiring components in between electrical equipment boxes. All that is necessary is that the equipment boxes have substantially aligned spiral key holes as set forth hereinabove.

Figure 8:
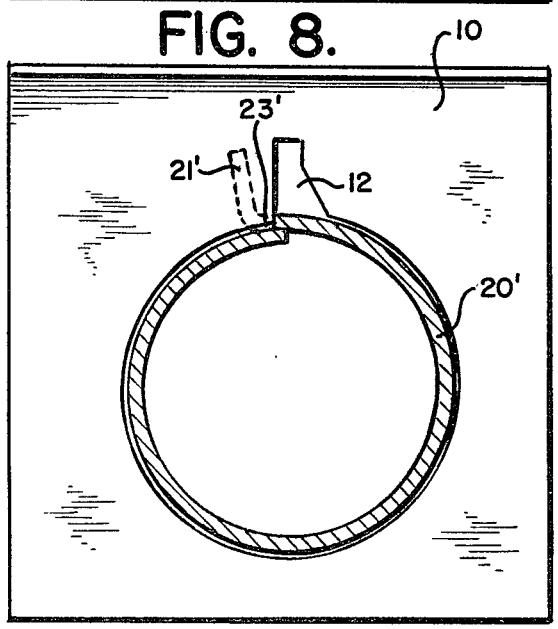
FIGS. 8 and 9 show sectional end views of the two ends of the tube of the embodiment of FIG. 7 at the end plates when the tube is in the temporarily retained position.
Figure 9:
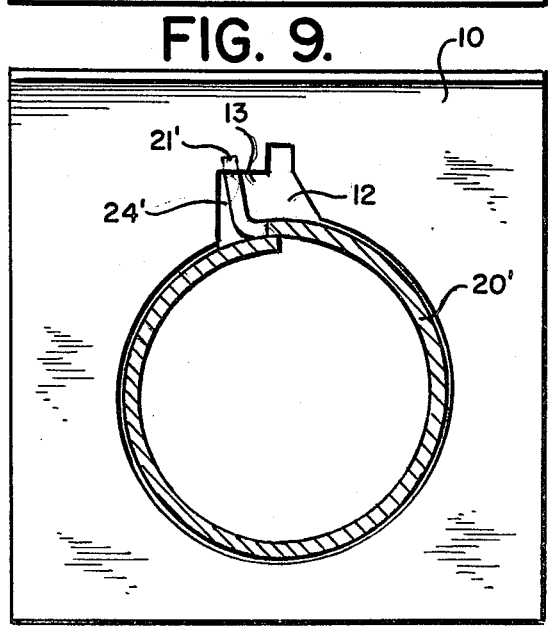
Figure 10:
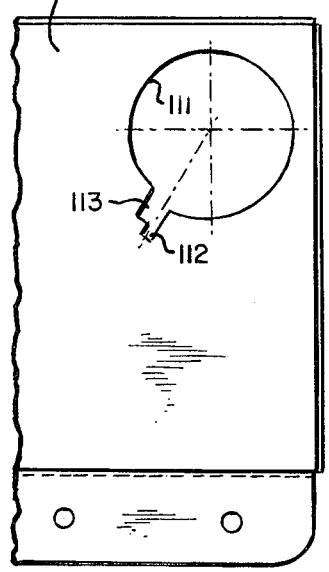
FIG. 10 is a partial front view of an alternate embodiment of the end plate key hole for one side of a fixture.
Figure 11:
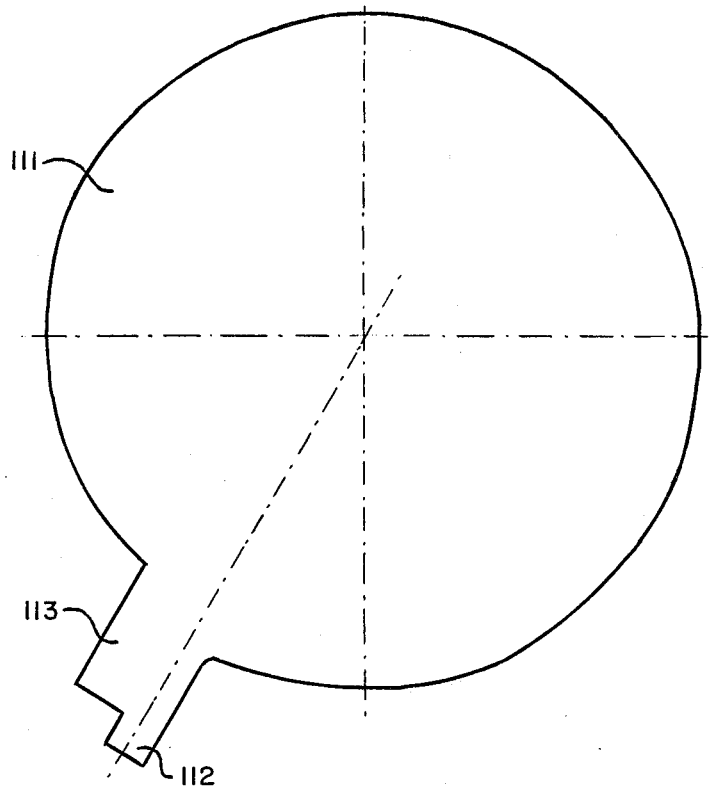
FIG. 11 is a detail of the key hole of FIG. 10.
Figure 12:
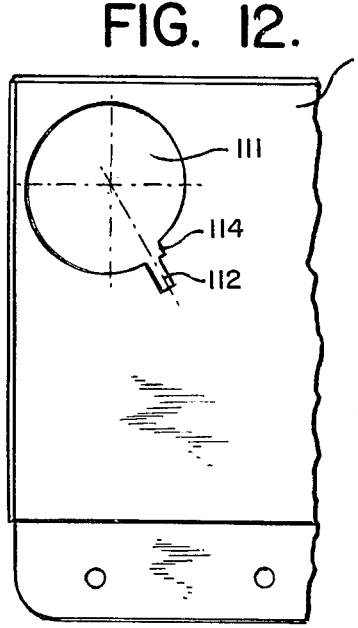
FIG. 12 is a partial front view of the end plate key hole for the other side of the fixture in the embodiment of FIG. 10.
Figure 13:
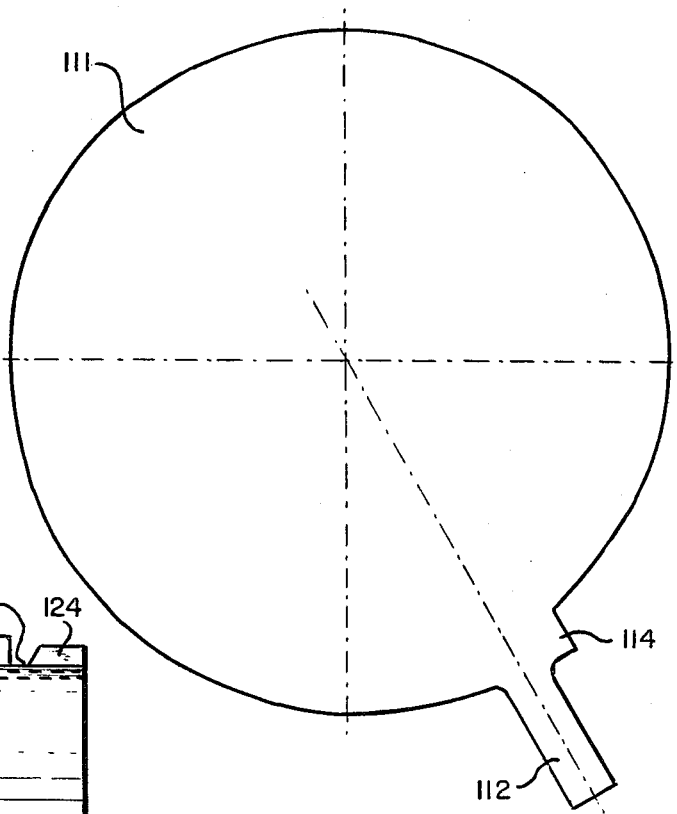
FIG. 13 is a detail of the key hole of FIG. 12.

FIGS. 7–9 illustrate a modification of the key hole and tube to achieve further advantages.

The embodiment of FIGS. 7–9 includes means for releasably retaining one end of the tube 20' in place on a lighting fixture. In this vein, each lighting fixture 4, 5 has one end plate of the tube thereof with a modified key hole wherein the slot thereof has a cutout 13 at the side of the slot 12 in the counterclockwise direction and which extends radially outwardly from the circumference of the key hole to an extent which falls short of the radial extent of the slot 12.

The tube 20' is modified such that the flange 21' has notches 22' and 23' thereon. Notch 22' has an inward edge thereof normal to the longitudinal axis of the tube 20' and the tab 24' formed outwardly thereof has a height which is less than the radial extent of the cutout 13 so as to be slidably received therein. On the other end of the tube 20', the notch 23' is V-shaped, but extends into the outer surface of the tube over a short portion of the circumference for the reason which will be set forth hereinafter.

In use, the tube 20' is inserted with the end including tab 25' into the key hole not having the cutout and of a fixture which is preferably still slidable along the track. At this point, the tube is rotated in the counterclockwise direction to a position shown in FIG. 8 such that the circumferential excess portion of the V-shaped notch 23' engages with the side of the slot 12 providing a releasable friction coupling. In this manner, the tube 20' is immobilized or longitudinally releasably retained in this position temporarily.

Assuming the other lighting fixture with the end plate thereof having the cutout 13 in the key hole and slot is clamped in place, the tube 20' and the fixture attached thereto are moved toward the slot in the clamped fixture. The relative position of the tab 24' and the cutout 13 can be seen in FIG. 9 by the dotted line signifying the height of the tab 24' and flange 21'. Because the cutout 13 has a lesser radial extent than the flange 21', as the tube is slid toward the fixture, the end plate 10 at the top of the cutout 13 will abut against the edge of the notch 22' which is normal to the longitudinal axis of the tube 20' thus indicating that the lighting fixture and tube are in the proper aligned position. The tube 20' is then rotated in the clockwise direction in order to lock it in place in the manner set forth in the prior embodiment. The positioned lighting fixture can now be clamped in the track in the set position.

The releasable retaining means described hereinabove also has the advantage of enabling the tube 20' to be shipped with the lighting fixture and mounted within the lighting fixture. This is carried out by sliding the tube within the lighting fixture with one end thereof having the notch 22' aligned with the end plate key hole and turning the tube in the clockwise direction to retain it in place. Furthermore, the lighting fixtures can be shipped with the electrical conductors already threaded into the tube and having the plug thereof hanging out of the tube so that it can be easily and expediently connected to the next fixture without the complex and time consuming process of threading the wires through the tubing at the construction site.

It will become apparent that the present invention also produces substantial advantages when it is desired to remove or otherwise move a fixture in a string of interconnected fixtures. That is, when it is desired to remove a fixture, each one of the conduits or tubes connected to the respective ends of the fixture is rotated in a counterclockwise direction to release the same. The tubes are then removed from the particular fixture to free the fixture.

In accordance with the present invention, the tolerances between the tubes and the associated key hole is such as to permit the tube, when received in a hole, to be angled downwardly or upwardly past the next adjacent fixture. This permits the easy insertion or removal of a tube when adjacent fixtures are still clamped in place.

The tube 20' also preferably has beveled corners for the tabs 24', 25' to aid in the insertion process.

FIGS. 10–14 illustrate a further modification of the key hole and tube to achieve further advantages over conventional systems and methods of assembling lighting systems.

The embodiment of FIGS. 10–14 includes an alternative structure for the means for releasably retaining one end of the tube 20'' in place on a lighting fixture. In this embodiment both end plates 110 have the Archimedean spiral key hole 111 with a slot 112. In the embodiment shown in FIGS. 10–11, the key hole on the right side has a cutout 113 in slot 112 at the edge nearest the smallest radius which extends radially outwardly from the circumference of the key hole to an extent which falls short of the radial extent of the slot 112. In the key hole on the left side shown in FIGS. 12 and 13, the slot 112 has a notch 114 in the edge nearest the largest radius.

Figure 14:
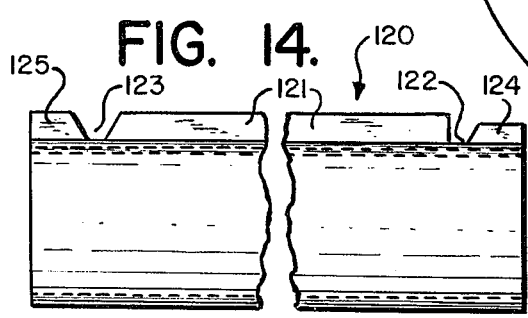
FIG. 14 is a side view of the connector tube for the embodiment of FIGS. 10-14.

The tube 120 for this embodiment as shown in FIG. 14, is similar to that of FIG. 7, except that notch 122 and 123 are of identical extent and are equivalent to notch 22' of FIG. 7 but do not include the circumferential extension of the notch. The tab 124 formed outwardly of notch 122 has a height which is less than the radial extent of the cutout 113 so as to be slidably received therein. The other tab 125, has the same height as spline 121.

In use, the tube 120 is inserted with the end including tab 125 into the key hole 111 having the notch 114 of a fixture which is preferably still slidable along the track. At this point, the tube is rotated or twisted in the counterclockwise direction as allowed by the notch 114. Notch 114 is configured at the radially outermost edge to frictionally engage the tube having the largest radius, providing a releasable friction coupling. In this manner, the tube 120 is immobilized or releasably retained in this position temporarily.

Assuming the other lighting fixture with the end plate thereof having the circuit 113 in the key hole 111 and slot 112 is clamped in place, the tube 120 and the fixture attached thereto are moved toward the slot in the clamped fixture. The relative position of the tab 124 and the cutout 113 as was shown in FIG. 9 is again present, and because the cutout 113 has a lesser radial extent than the spline 121, as the tube is slid toward the fixture, the end plate 110 at the top of the cutout 113 will abut against the edge of the notch 122 which is normal to the longitudinal axis of the tube 120 thus indicating that the lighting fixture and tube are in the proper aligned position. The tube 120 is then rotated in the clockwise direction in order to lock it in place in the manner set forth in the prior embodiment. The positioned lighting fixture can now be clamped on the track in the set position.

As in the previous embodiment, the releasable retaining means described hereinabove also has the advantage of enabling the tube 120 to be shipped with the lighting fixture and mounted within the lighting fixture. This is carried out by sliding the tube within the lighting fixture with one end thereof having the notch 122 aligned with the end plate key hole and turning the tube in the clockwise direction to retain it in place. Furthermore, the lighting fixture can be shipped with the electrical conductors already threaded into the tube and having the plug thereof hanging out of the tube so that it can be easily and expediently connected to the next fixture without the complex and time consuming process of threading the conduit through the tubing at the construction site.

Although precise embodiments of the invention have been described in detail herein with respect to the accompanying drawings, it is to be understood that the invention is not limited to those precise embodiments, and that various changes and modifications may be effected therein by one skilled in the art without departing from the scope or spirit of this invention.

What is claimed is:

1. In a lighting systems having at least two lighting fixtures each including end plates and at least one rigid conduit connector therebetween, the improvement wherein:

each end plate has an opening forming at least one alignable key hole therein having a substantially circular spiral circumference; and a tube having a substantially circular open spiral surface longitudinally slidably received in each key hole in one given angular orientation, and to providing a friction-tight fit in the key hole in response to rotation of the tube around its longitudinal axis in one direction from said one given angular orientation.

2. The system according to claim 1, in which said spiral circumference and said spiral surface are Archimedean spirals.

3. The system according to claim 1, in which said connector includes lighting fixture spacing means comprising a longitudinal flange projecting radially outwardly from the surface of the tube at the edge of greatest radius, and a notch at each end portion of the flange spaced inwardly from the edge thereof and extending radially to the surface of the tube to form end tabs outwardly thereof, and a slot extending radially outwardly from the circumference of each key hole and configured to slidably receive the tabs therethrough when the tube is in said one given angular orientation, whereby said notches receive the end plates therein when said tube is rotated so that the distance between the notches defines the spacing between adjacent lighting fixtures.

4. The system according to claim 3, further comprising stop means disposed on each end plate and cooperative with the end tabs of the tube to limit the amount of rotation of the tube in said one direction.

5. The system according to claim 4, wherein the stop means comprises a member projecting from the surface of the end plate.

6. The system according to claim 3, wherein the spacing means further comprises retaining means for releasably and temporarily retaining one end of the tube in said hole so that relative longitudinal motion of said tube in said hole is prevented.

7. The system according to claim 6, wherein said retaining means comprises a circumferential slot in the surface of said tube communicating with one of said notches and configured to frictionally engage the edge of the portion of said end plate defining said key hole when said tube is rotated in the other direction from the one given angular orientation.

8. The system according to claim 7, and locating means to align the end plate of the adjacent fixture with the other of said notches when said tube is in the temporarily retained position, said locating means comprising a cutout in each key hole slot on the same end plate of each fixture at the side of the slot disposed in the other rotational direction, the cutout extending radially outwardly from the hole circumference and terminating short of the end of the slot and having a height less than that of said flange, the notch at the other end having the inward edge thereon normal to the longitudinal axis of the tube, and the one tab adjacent thereto having a reduced radial length and configured to be slidably received in the cutout.

9. The system according to claim 3, wherein the tube, flange and end tabs are formed from a single integral metal member.

10. A rigid conduit connector for use in connecting electrical fixtures comprising a tube having a substantially circular Archimedean spiral surface longitudinally slidably received in a similarly shaped key hole in one given angular orientation and to providing a friction-tight fit in a similarly shaped keyhole in response to rotation of the tube around its longitudinal axis in one direction from said one given angular orientation.

11. The connector according to claim 10, further comprising a longitudinal flange projecting radially outwardly from the surface of the tube at the edge of greatest radius and a notch at each end portion of the spline spaced inwardly from the edge thereof and extending radially to the surface of the tube to form end tabs outwardly thereof.

12. The connector according to claim 11, wherein the tube, flange and end tabs are formed from a single integral metal member.

* * * * *